(12) United States Patent
Limaye et al.

(10) Patent No.: US 11,386,231 B2
(45) Date of Patent: Jul. 12, 2022

(54) METHODS OF CONTEXT-BASED MOBILE DEVICE FEATURE CONTROL AND MOBILE DEVICES EMPLOYING THE SAME

(71) Applicant: Micron Technology, Inc., Boise, ID (US)

(72) Inventors: Aparna U. Limaye, Boise, ID (US); Lindsay Hamilton, Rancho Cordova, CA (US); Carla L. Christensen, Boise, ID (US); Cipriana Forgy, Meridian, ID (US); Brandi M. Jones, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/939,499

(22) Filed: Jul. 27, 2020

(65) Prior Publication Data
US 2021/0200885 A1 Jul. 1, 2021

Related U.S. Application Data

(60) Provisional application No. 62/955,687, filed on Dec. 31, 2019.

(51) Int. Cl.
*G06F 21/00* (2013.01)
*G06F 21/62* (2013.01)
(Continued)

(52) U.S. Cl.
CPC ............ *G06F 21/629* (2013.01); *G06F 21/32* (2013.01); *H04W 12/61* (2021.01); *H04W 12/63* (2021.01);
(Continued)

(58) Field of Classification Search
CPC .................. G06F 21/629; G06F 21/32; G06F 2221/2111; H04W 12/61; H04W 12/63;
(Continued)

(56) References Cited

U.S. PATENT DOCUMENTS

| 10,270,784 B1* | 4/2019 | Narges ................. H04W 12/37 |
| 2004/0123150 A1 | 6/2004 | Wright et al. |

(Continued)

FOREIGN PATENT DOCUMENTS

| CN | 101925152 A | 12/2010 |
| CN | 103686722 A | 3/2014 |

OTHER PUBLICATIONS

Office Action dated Dec. 21, 2021 for Chinese Patent Application No. 20211575446.9, 8 pages (with translation).

*Primary Examiner* — Alexander Lagor
(74) *Attorney, Agent, or Firm* — Perkins Coie LLP

(57) ABSTRACT

Methods and systems for context-based mobile device feature control are provided. One method comprises determining, with a mobile device, one or more contexts corresponding to the mobile device; selecting, from a predetermined set of security protocols, a security protocol corresponding to the determined one or more contexts; and adjusting a permission setting for one or more functional features of the mobile device based upon the selected security protocol. One apparatus comprises one or more features configure to input data, output data, transform data, or a combination thereof; and a controller configured to: determine one or more contexts corresponding to the mobile computing device, to select, from a predetermined set of security protocols, a security protocol corresponding to the determined one or more contexts, and to adjust a permission setting for the one or more functional features based upon the selected security protocol.

14 Claims, 5 Drawing Sheets

(51) Int. Cl.
*G06F 21/32* (2013.01)
*H04W 12/61* (2021.01)
*H04W 12/63* (2021.01)
*H04W 12/68* (2021.01)

(52) U.S. Cl.
CPC ..... *H04W 12/68* (2021.01); *G06F 2221/2111* (2013.01)

(58) Field of Classification Search
CPC ..... H04W 12/68; H04W 12/60; H04W 12/65; H04W 12/66; H04W 12/67
See application file for complete search history.

(56) References Cited

U.S. PATENT DOCUMENTS

| | | | |
|---|---|---|---|
| 2014/0040979 A1* | 2/2014 | Barton | G06F 21/72 726/1 |
| 2014/0207974 A1* | 7/2014 | Pulipakkam | H04W 48/04 710/11 |
| 2014/0330945 A1* | 11/2014 | Dabbiere | H04W 4/021 709/220 |
| 2016/0286034 A1* | 9/2016 | Iyer | H04W 12/08 |
| 2019/0182749 A1* | 6/2019 | Breaux | H04W 4/80 |

* cited by examiner

METHODS OF CONTEXT-BASED MOBILE DEVICE FEATURE CONTROL AND MOBILE DEVICES EMPLOYING THE SAME

CROSS-REFERENCE TO RELATED APPLICATION

This application claims the benefit of U.S. Provisional Patent Application No. 62/955,687, filed on Dec. 31, 2019, which is incorporated by reference herein in its entirety.

TECHNICAL FIELD

The present disclosure generally relates to mobile devices, and more particularly relates to methods of context-based mobile device feature control and mobile devices employing the same.

BACKGROUND

Mobile devices (e.g., smartphones, tablet computers, laptop computers, other mobile computing devices, etc.) are widely utilized environments where secure access policies related to sensitive information are implemented. Some such secure locations require the surrender of mobile devices before entry to prevent the unauthorized recording (e.g., with cameras, microphones, or other sensors) or copying (e.g., with portable storage devices or local network access) of secure information and/or data. These policies, while effective, can be excessively strict for some secure locations, where access to some features of a mobile device (e.g., telephone calls, note taking, etc.) may be desired. Accordingly, improved provide methods and systems that permit more granular control over the features of a mobile device to provide information security in a secure location are needed.

DETAILED DESCRIPTION

Figure 1:
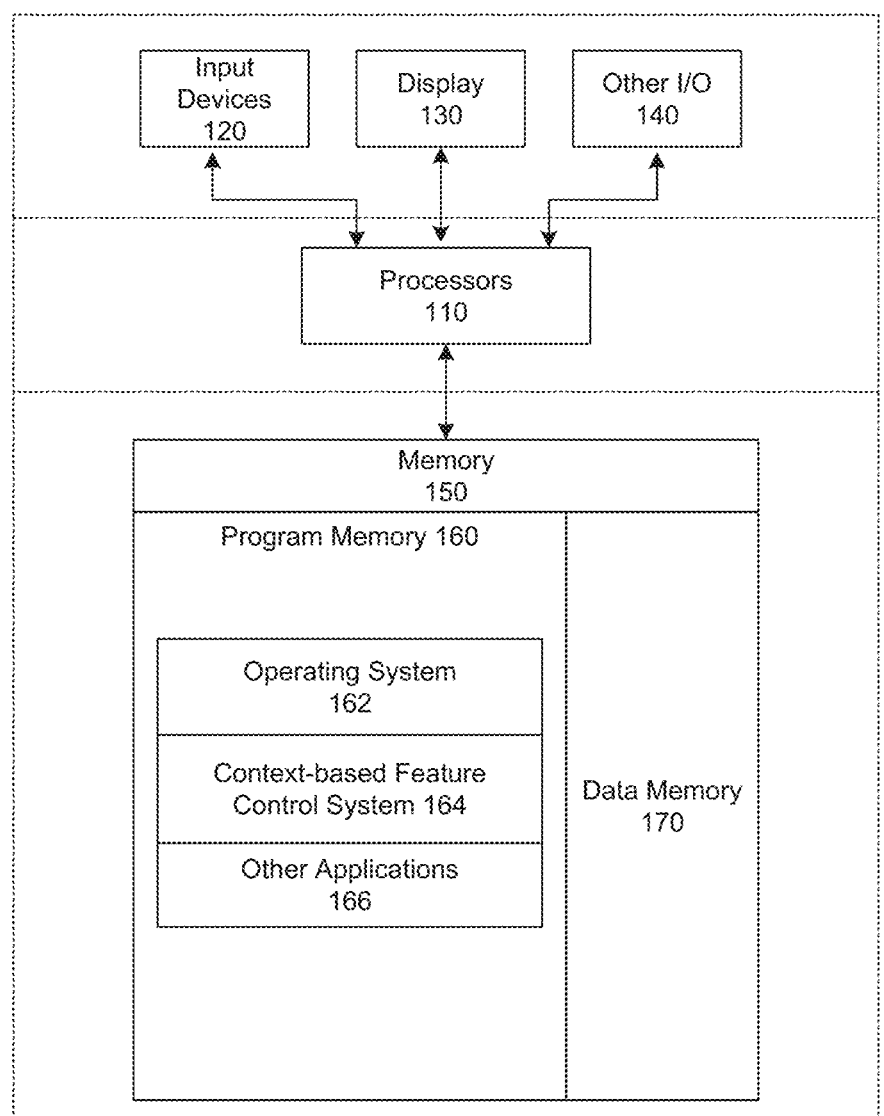
FIG. 1 is a block diagram schematically illustrating a mobile computing device in accordance with an embodiment of the present disclosure.

As set forth above, mobile devices can include a variety of functional features (e.g., device hardware, applications, application features, etc.) that pose varying levels of concern from an information security perspective. Rather than restricting access to the entire mobile device (e.g., by confiscating it) in a secure location, embodiments of the present disclosure provide feature-level enforcement of permission settings based upon security profiles associated with various contexts (e.g., device location, network connectivity, proximity to a security beacon, local time, a combination thereof, etc.). By enforcing permissions (e.g., enablement, disablement, authentication requirements) at a feature-level, information security concerns can be allayed (e.g., by restricting access to features implicated in data capture and data sharing) while permitting access to device features that pose little or no information security threat and/or to which continued access may be desired (e.g., telephony, health monitoring, note taking, personal media, etc.).

In this regard, several embodiments of the present technology provide methods and systems for context-based mobile device feature control. In one embodiment, a method comprises determining, with a mobile device, one or more contexts corresponding to the mobile device; selecting, from a predetermined set of security protocols, a security protocol corresponding to the determined one or more contexts; and adjusting a permission setting for one or more functional features of the mobile device based upon the selected security protocol.

By way of example, in one embodiment, a corporate facility with a secure research and development environment may wish to prevent photography and file copying by mobile devices in the secure environment. By configuring a security protocol to correspond with the secure environment (e.g., via GPS geofencing, WiFi network connectivity, cellular tower triangulation, proximity to a security beacon, etc.), permission to access a mobile device camera hardware and application features corresponding to mass storage device capability can be denied. Remaining features of the mobile device which are determined to pose no information security threat, such as speaker and microphone access (e.g., albeit without access to applications that might make unauthorized recordings using the same), telephone applications, and the like, can be left unrestricted.

Relevant contexts that correspond to different security profiles are not limited to location, however, as other contexts may also be relevant. For example, in some circumstances, a combination of both location and time may define a context (e.g., corresponding to the duration a secure meeting in an otherwise insecure environment). Still other contextual information such as the connection of a mobile device to a particular network may also be relevant to selecting a security policy for use in a particular environment. Moreover, relevant contexts need not implicate location at all (e.g., during participation in a remotely-attended meeting, for security reasons, audio recording may need to be disabled via enforcement of security permissions to applications with access to the microphone other than the application via which the meeting is being attended).

According to one aspect of the present disclosure, security policies can be installed and managed on a mobile device (with the permission of the owner/user thereof) by the administrator of a secure environment. For example, mobile device management (MDM) profiles can be installed and configured to enforce permission settings corresponding to a security profile, as will be readily understood by those of skill in the art.

For example, FIG. 1 is a block diagram schematically illustrating a mobile device on which some implementations of the disclosed technology can operate. Mobile device 100 can include one or more input devices 120 that provide input to the processor(s) 110 (e.g., CPU(s), GPU(s), APU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a biometric sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, an OLED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the mobile device 100 also includes a communication device capable of communicating via a wireless or wire-based connection with a network node. The communication device can communicate with another device or a server through a network using, for example, TCP/IP protocols. Mobile device 100 can utilize the communication device to distribute operations across multiple network devices.

The processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, context-based feature control system 164, and other application programs 166. Memory 150 can also include data memory 170, e.g., security protocols and permission settings, keys for verifying credentials and biometrics, mappings of permission settings to hardware devices, applications and/or application features to enable, disable, or restrict access, configuration data, settings, user options or preferences, etc., which can be provided to the program memory 160 or any element of the mobile device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, internet of things (IoT) devices, edge computing devices, distributed computing environments that include any of the above systems or devices, or the like.

Figure 2:
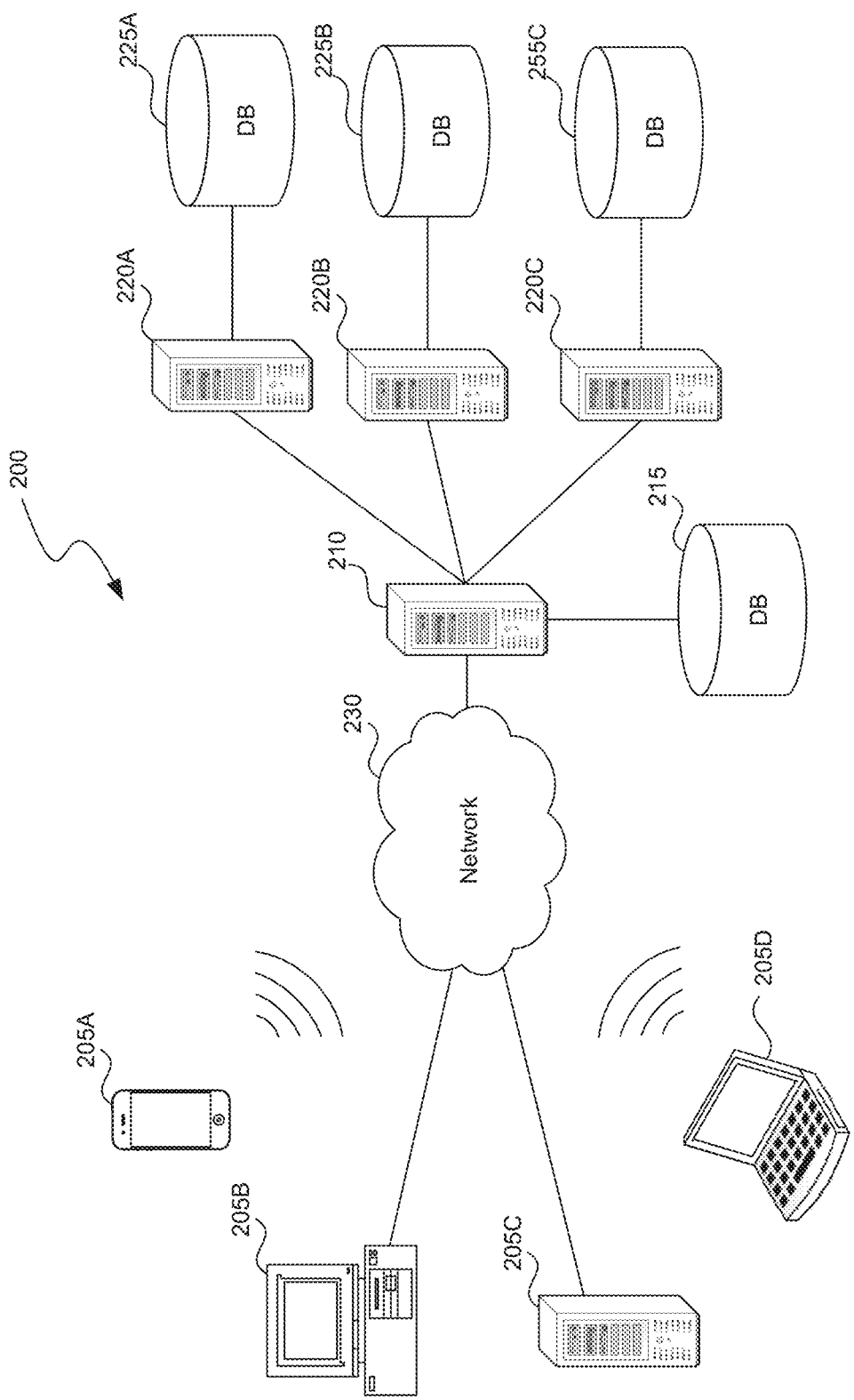
FIG. 2 is a block diagram schematically illustrating a network environment in which some embodiment of the present disclosure may be operated.

FIG. 2 is a block diagram illustrating an overview of an environment 200 in which some implementations of the disclosed technology can operate. Environment 200 can include one or more client computing devices 205A-D, examples of which can include mobile device 100. Client computing devices 205 can operate in a networked environment using logical connections through network 230 to one or more remote computers, such as a server computing device. In some implementations, the context-based feature control system 164 can receive permission settings in security protocols provided over network 230, e.g., by an employer or other device administrator. Also, in some cases, some authentication procedures set in the permission settings of the context-based feature control system 164 can specify that credential verification with a third party, over network 230, is required.

In some implementations, server 210 can be an edge server which receives client requests and coordinates fulfillment of those requests through other servers, such as servers 220A-C. Server computing devices 210 and 220 can comprise computing systems, such as mobile device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN), a wide area network (WAN), or any other wired or wireless networks using any one of a number of networking protocols (e.g., 802.11, cellular, Bluetooth, point-to-point, etc.). Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
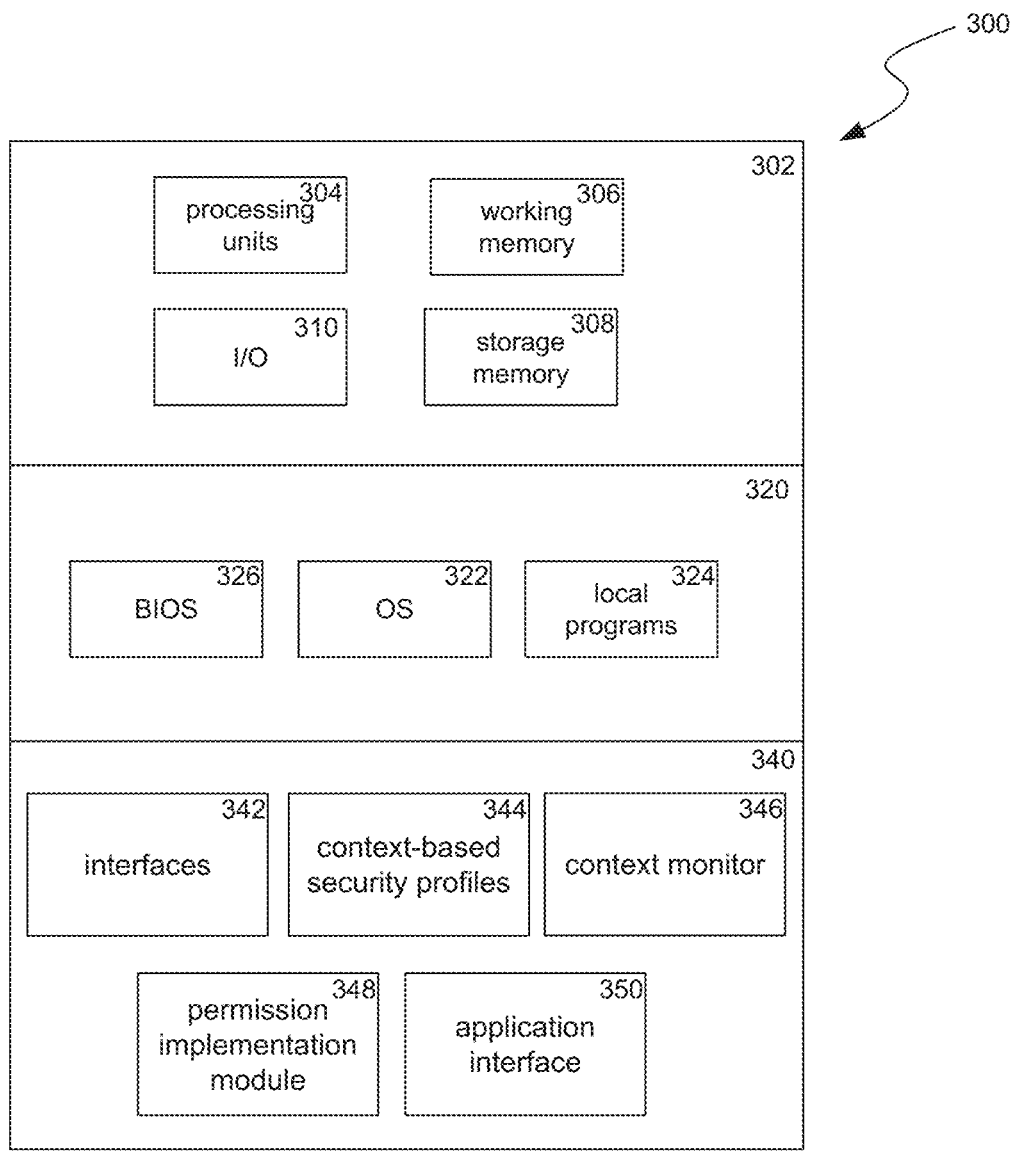
FIG. 3 is a block diagram schematically illustrating components of a mobile computing device which can be used to implement embodiments of the present disclosure.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include context-based security profiles 344, security event monitor 346, permission implementation module 348, application interface 350, and components which can be used for providing user interfaces, transferring data, and APIs and other handles for controlling the specialized components and other applications, such as interfaces 342. In some implementations, components 300 can be in a computing system that is distributed across multiple computing devices or can be an interface to a server-based application executing one or more of specialized components 340.

The context-based security profiles 344 can be user-, administrator-, or application provider-defined mappings between A) contexts and B) device hardware, applications, or combinations thereof to enable, disable, or restrict for particular security profiles. The context-based security profiles 344 can also define which contexts correspond to which security profiles and which permission settings are used for that security profile. The context monitor 346 can identify contexts mapped in the context-based security profiles 344. For example, the context monitor 346 can identify a location change, a network connectivity change, a proximity to a security beacon, a local time of the device, or a combination thereof. The permission implementation module 348 can enforce permissions defined for each security profile of the context-based security profiles 344. For example, the permission implementation module 348 can disable an application, an application feature, or device hardware of the mobile device, can enforce an authentication before allowing access to the same (e.g., by verifying a received password, biometric information, a PIN, or the like), or can determine that no authentication procedures are required for some security profiles. The application interface 350 can cause one or more applications and/or application features to be enabled, disabled, or restricted (e.g., via authentication) according to the mapping defined in the context-based security profiles 344. The application interface can be invoked by the context-based security profiles 344 following an identified context from context monitor 346 and/or by a successful authentication procedure by authentication implementation module 348. In some implementations, the enabling and/or disabling of applications can be performed via an operating system of the current device and the enabling and/or disabling of application features can be performed via API calls to the applications with those features. The interfaces 342 can cause one or more device hardware features to be enabled, disabled, or restricted (e.g., via authentication) according to the mapping defined in the context-based security profiles 344.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
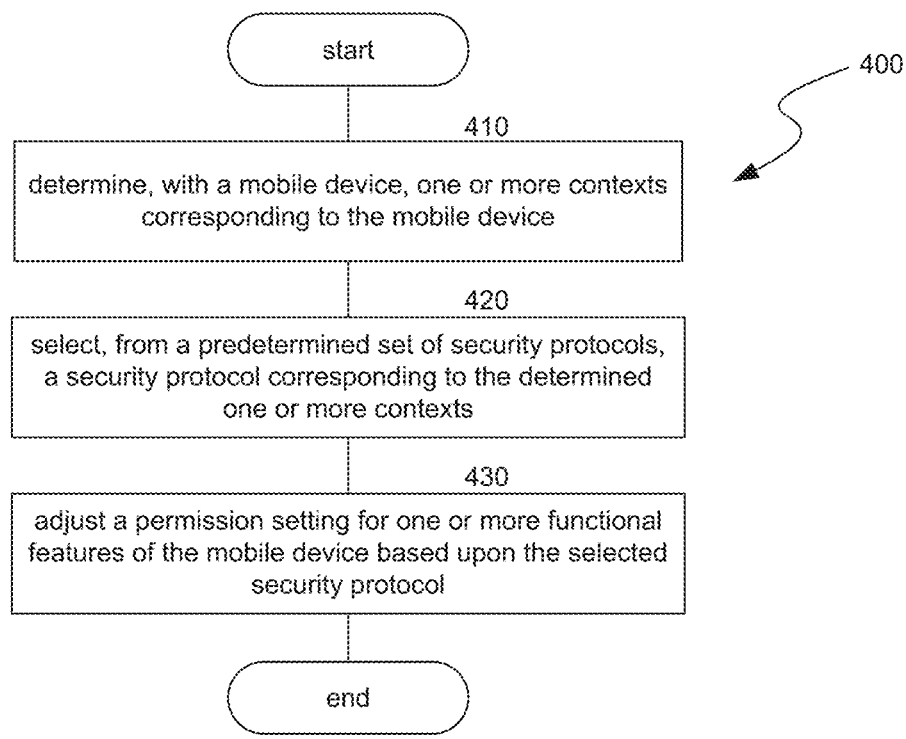
FIGS. 4 and 5 are flowcharts illustrating methods of context-based mobile device feature control in accordance with embodiments of the present technology.

FIG. 4 is a flowchart 400 illustrating a method of context-based mobile device feature control in accordance with embodiments of the present technology. The flowchart 400 may be an example of or include aspects of a method that a mobile device (e.g., mobile device 100 and/or components 300) may perform as described with reference to FIGS. 1 through 3.

The method includes determining, with a mobile device, one or more contexts corresponding to the mobile device (box 410). In accordance with one aspect of the present technology, the determining feature of box 410 can be performed by a mobile device (e.g., the mobile device 100 and/or components 300), in conjunction with the context-based feature control system 164 and/or context monitor 346, as described with reference to FIGS. 1 through 3.

The method further includes selecting, from a predetermined set of security protocols, a security protocol corresponding to the determined one or more contexts (box 420). In accordance with one aspect of the present technology, the selecting feature of box 420 can be performed by a mobile device (e.g., mobile device 100 and/or components 300), in conjunction with the context-based feature control system 164 and/or context-based security profiles 344, as described with reference to FIGS. 1 through 3.

The method further includes adjusting a permission setting for one or more functional features of the mobile device based upon the selected security protocol (box 430). In accordance with one aspect of the present technology, the adjusting feature of box 430 can be performed by a mobile device (e.g., the mobile device 100 and/or components 300), in conjunction with the context-based feature control system 164 and/or permission implementation module 348, as described with reference to FIGS. 1 through 3.

Figure 5:
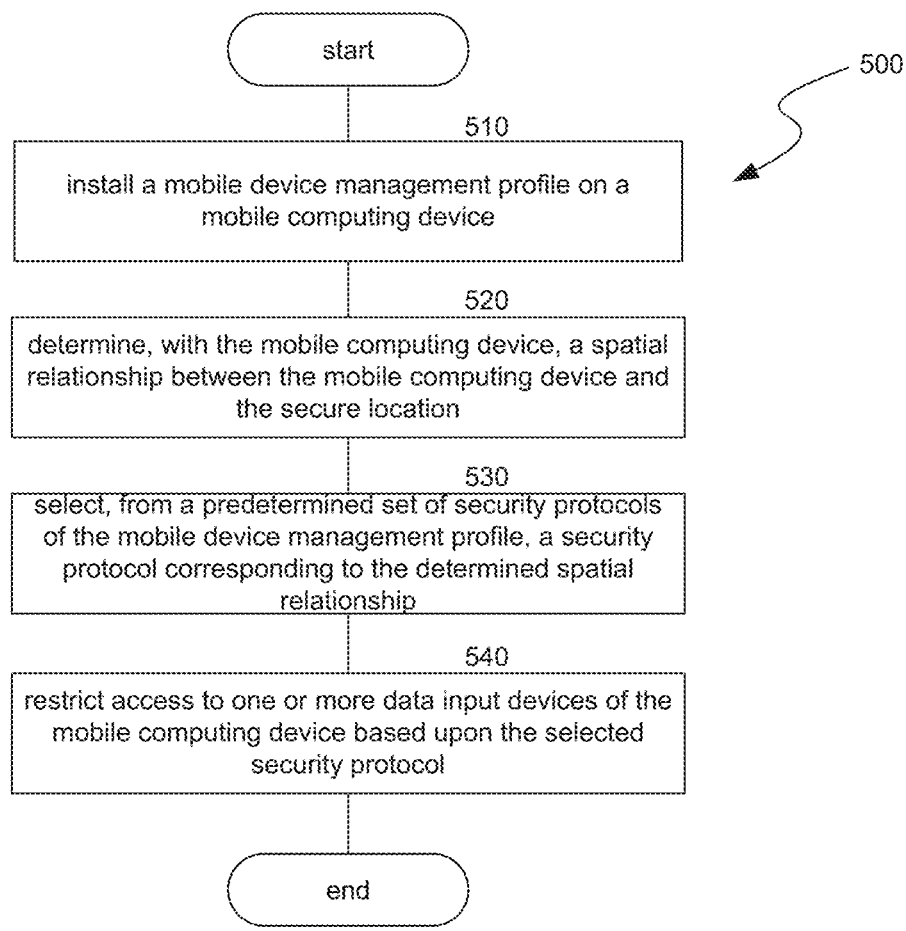

FIG. 5 is a flowchart 500 illustrating a method of managing access to information in a secure location in accordance with embodiments of the present technology. The flowchart 500 may be an example of or include aspects of a method that a mobile device (e.g., mobile device 100 and/or components 300) may perform as described with reference to FIGS. 1 through 3.

The method includes installing a mobile device management profile on a mobile computing device (box 510). In accordance with one aspect of the present technology, the installing feature of box 510 can be performed by a mobile device (e.g., mobile device 100 and/or components 300), in conjunction with the processors 110 in some cases, as described with reference to FIGS. 1 through 3.

The method further includes determining, with the mobile computing device, a spatial relationship between the mobile computing device and the secure location (box 520). In accordance with one aspect of the present technology, the determining feature of box 520 can be performed by a mobile device (e.g., mobile device 100 and/or components 300), in conjunction with the context monitor 346 in some cases, as described with reference to FIGS. 1 through 3.

The method further includes selecting, from a predetermined set of security protocols of the mobile device management profile, a security protocol corresponding to the determined spatial relationship (box 530). In accordance with one aspect of the present technology, the selecting feature of box 530 can be performed by a mobile device (e.g., mobile device 100 and/or components 300), in conjunction with the context-based security profiles 344 in some cases, as described with reference to FIGS. 1 through 3.

The method further includes restricting access to one or more data input devices of the mobile computing device based upon the selected security protocol (box 540). In accordance with one aspect of the present technology, the restricting feature of box 540 can be performed by a mobile device (e.g., mobile device 100 and/or components 300), in conjunction with the permission implementation module 348 in some cases, as described with reference to FIGS. 1 through 3.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   determining, with a mobile device, one or more contexts corresponding to the mobile device;
   selecting, from a predetermined set of security protocols, a security protocol corresponding to the determined one or more contexts; and
   adjusting a permission setting for one or more functional features of the mobile device based upon the selected security protocol,
   wherein the permission setting comprises restricting access to the one or more functional features by requiring authentication via a password, a biometric identifier, or a combination thereof, and wherein the password and/or the biometric identifier correspond to an administrator of the security protocol.

2. The method of claim 1, wherein the one or more contexts comprise a location of the mobile device, a wireless network to which the mobile device is connected, a proximity of the mobile device to a security beacon, a local time of the mobile device, a detected movement of the mobile device, a proximity of the mobile device to a second mobile device, or a combination thereof.

3. The method of claim 1, wherein the one or more functional features of the mobile device include a camera device, a microphone device, a sensor device, a display device, a data storage device, a networking device, an input/output port device, an antenna, a software application, or a combination thereof.

4. The method of claim 1, wherein the one or more functional features of the mobile device include a secure data storage area, an encryption engine, a decryption engine, or a combination thereof.

5. The method of claim 1, wherein the security protocol is comprised by a mobile device management profile managed on the mobile device by the administrator.

6. The method of claim 1, wherein the mobile device comprises a smartphone, a tablet computer, a laptop computer, an internet of things (IoT) device, a wearable computing device, or an automobile-mounted computer.

7. A mobile computing device, comprising:
   one or more features configured to input data, output data, transform data, or a combination thereof; and
   a controller configured to:
      determine one or more contexts corresponding to the mobile computing device,
      select, from a predetermined set of security protocols, a security protocol corresponding to the determined one or more contexts, and
      adjust a permission setting for the one or more functional features based upon the selected security protocol,
   wherein the permission setting comprises restricting access to the one or more features by requiring authentication via a password, a biometric identifier, or a combination thereof, and wherein the password and/or the biometric identifier correspond to an administrator of the security protocol.

8. The mobile computing device of claim 7, wherein the one or more contexts comprise a location of the mobile computing device, a wireless network to which the mobile computing device is connected, a proximity of the mobile computing device to a security beacon, a local time of the mobile computing device, a detected movement of the mobile computing device, a proximity of the mobile computing device to a second mobile device or a combination thereof.

9. The mobile computing device of claim 7, wherein the one or more functional features of the mobile computing device include a camera device, a microphone device, a sensor device, a display device, a data storage device, a networking device, an input/output port device, an antenna, a software application, or a combination thereof.

10. The mobile computing device of claim 7, wherein the one or more functional features of the mobile computing device include a secure data storage area, an encryption engine, a decryption engine, or a combination thereof.

11. The mobile computing device of claim 7, wherein the security protocol is comprised by a mobile device management profile managed on the mobile device by the administrator.

12. The mobile computing device of claim 7, wherein the mobile computing device comprises a smartphone, a tablet computer, or a laptop computer.

13. A method of managing access to information in a secure location, comprising:
- installing a mobile device management profile on a mobile computing device;
- determining, with the mobile computing device, a spatial relationship between the mobile computing device and the secure location;
- selecting, from a predetermined set of security protocols of the mobile device management profile, a security protocol corresponding to the determined spatial relationship; and
- restricting access to one or more data input devices of the mobile computing device based upon the selected security protocol,
- wherein restricting access to the one or more data input devices includes requiring authentication via a password, a biometric identifier, or a combination thereof, and wherein the password and/or the biometric identifier correspond to an administrator of the security protocol.

14. The method of claim 13, wherein the one or more data input devices comprise a camera device, a microphone device, a sensor device, a data storage device, a networking device, an input/output port device, an antenna, or a combination thereof.

* * * * *